United States Patent [19]

Mikami et al.

[11] Patent Number: 5,426,154
[45] Date of Patent: Jun. 20, 1995

[54] THERMALLY REVERSIBLE GRAFT COPOLYMER

[75] Inventors: Masato Mikami; Yuichi Mori; Hiroshi Yoshioka, all of Kanagawa, Japan

[73] Assignee: W. R. Grace & Co.-Conn., New York, N.Y.

[21] Appl. No.: 762,280

[22] Filed: Sep. 19, 1991

[51] Int. Cl.$^6$ .................... C08F 265/10; C08F 267/10
[52] U.S. Cl. ..................................... 525/296; 525/218; 525/239; 522/127
[58] Field of Search ........................ 525/296, 218, 239; 522/127

[56] References Cited

U.S. PATENT DOCUMENTS

| | | |
|---|---|---|
| 4,536,545 | 8/1985 | Olener et al. ............... 525/296 |
| 4,605,721 | 8/1986 | Jenkins et al. ............... 527/312 |
| 4,683,258 | 7/1987 | Itoh et al. ............... 524/434 |

FOREIGN PATENT DOCUMENTS

| | | |
|---|---|---|
| 0161881 | 11/1985 | European Pat. Off. |
| 54-074871 | 6/1979 | Japan |
| 62-253638 | 11/1987 | Japan |
| 63-273601 | 11/1988 | Japan |
| 392180 | 11/1973 | U.S.S.R. |

*Primary Examiner*—John Kight, III
*Assistant Examiner*—Duc Truong
*Attorney, Agent, or Firm*—Bharat C. Gandhi

[57] ABSTRACT

This invention provides thermally reversible graft copolymer comprising a vinyl polymer graft-polymerized to a polymer of N-substituted acrylamide or methacrylamide derivatives.

13 Claims, 2 Drawing Sheets

THERMALLY REVERSIBLE GRAFT COPOLYMER

FIELD OF THE INVENTION

This invention relates to a thermally reversible graft polymer. More specifically, it relates to a vinyl polymer comprising vinyl chloride units graft-polymerized with a polymer of N-substituted acrylamide or methacrylamide derivative alone or a copolymer of N-substituted acrylamide or methacrylamide derivative together with a monomer copolymerizable therewith.

BACKGROUND OF THE INVENTION

Among water-soluble polymeric compounds, those which, in a state of an aqueous solution, show a special reversible solubility behavior such as precipitation and formation of white turbidity at a temperature higher than the LCST (lower critical solution temperature which is the transition temperature for the hydration and dehydration of temperature-responsive polymer) and dissolution and becoming clear at the temperature lower than the LCST, are called thermally reversible polymers. Thermally reversible polymers are being applied in light-shielding members or adsorbents. However, because the thermally reversible polymer itself can dissolve in water at low temperatures, it has to be insolubilized or immobilized by some method such as by formation of crosslinking or by grafting to a supporting member, in order to make it available for wider application.

Modified thermally reversible polymers have been reported in many research reports or patent publications [Okihiko Hirasa, *Sen'i Kobunshi Kenkyusho Hokoku*, No. 144, p. 139 (1984); Ko Ka et al., *Kagaku Kogaku Ronbunshu*, v. 13, p. 518 (1987); Japanese Patent Publication (Kokai) Nos. 250016/1985 and 233184/1985 Japanese Patent No. 1,389,504 etc.]. However, because these prior art polymers still have problems such as poor moldability and poor mechanical properties, application of thermally reversible polymers has been limited.

SUMMARY OF THE INVENTION

This invention provides a thermally reversible graft copolymer which avoids the problems of the conventional thermally reversible polymers by carrying out graft polymerization with polymers comprising vinyl chloride units (e.g., the general purpose polyvinyl chloride resins which are widely used in sheets, films, tubes, and injection molded articles, etc.).

A graft copolymer in accordance with the invention is prepared by grafting component A: a polymer of an N-substituted acrylamide or methacrylamide derivative or component A': a copolymer of N-substituted acrylamide or methacrylamide derivative and a monomer copolymerizable therewith onto component B a vinyl polymer comprising vinyl chloride units, wherein said component A or said component A' preferably has an LCST of 0° C. to 100° C. in water.

DETAILED DESCRIPTION OF THE INVENTION

Figure 1:
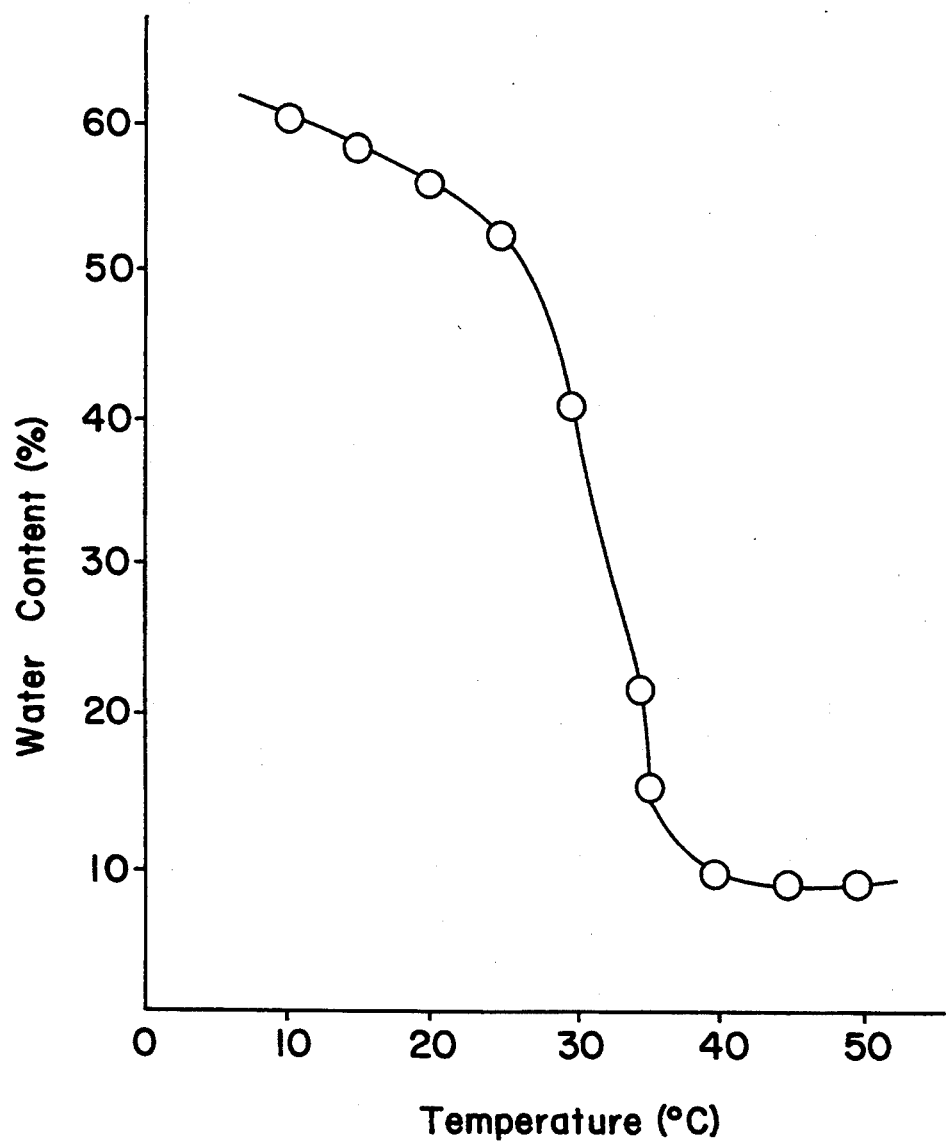
FIG. 1 is a graph showing the relationship between the water content of a polyvinyl chloride graftpolymerized with poly(N-isopropyl acrylamide) and temperature.

Exemplary N-substituted acrylamide or methacrylamide derivatives forming the polymer component A which can be graftpolymerized on the vinyl polymer comprising vinyl chloride units in the present invention include N-acryloyl piperidine, N-n-propyl methacrylamide, N-isopropyl acrylamide, N,N-diethyl acrylamide, N-isopropyl methacrylamide, N-cyclopropyl acrylamide, N-acryloyl pyrrolidine, N,N-ethylmethyl acrylamide, N-cyclopropyl methacrylamide and N-ethyl acrylamide.

Any monomers which are copolymerizable with the above described N-substituted acrylamide or methacrylamide derivatives can be employed to form component A'. Examples of such copolymerizable monomers which can be employed in the present invention include hydrophilic monomers such as N-vinyl pyrrolidone, vinyl pyridine, acrylamide, methacrylamide, N-methyl acrylamide, hydroxyethyl methacrylate, hydroxyethyl acrylate, acrylic acid and methacrylic acid and their salts, vinylsulfonic acid, styrenesulfonic acid; compounds having basic groups such as N,N-dimethylaminoethyl methacrylate, N,N-diethylaminoethyl methacrylate, N,N-dimethylaminopropyl acrylamide and their salts; and hydrophobic monomers such as acrylates or methacrylates including ethyl acrylate, methyl methacrylate, n-butyl methacrylate, and glycidyl methacrylate.

In the present invention, polymer component A or component A' preferably has an LCST of 0° C. to 100° C. in water.

The LCST of the graft copolymer can be easily controlled by properly selecting the copolymerizable monomer. If it is desired to obtain a graft copolymer having a relatively high LCST, a hydrophilic monomer is preferably copolymerized with the acrylamide or methacrylamide derivative. If it is desired to obtain a graft copolymer having a relatively low LCST, a hydrophobic monomer is preferably copolymerized.

The LCST of the graft copolymer can be measured by the differential scanning calorimetry.

Any vinyl polymers comprising vinyl chloride units can be employed in the present invention as component B. Exemplary vinyl polymers include vinyl chloride homopolymers, copolymers of vinyl chloride and vinyl acetate, and copolymers of vinyl chloride, vinyl acetate and ethylene. In the case of the vinylchloride copolymers, it is preferred that the copolymers contain at least 10 weight % vinyl chloride units in order to use various characteristic features which polyvinyl chloride possesses.

There is no particular restriction on the method for grafting component A or component A' to component B, and any methods known in the art can be used. For example, the graft copolymer can be obtained by thermal polymerization forming of component A or component A' in the presence of component B with the use of a hydrogen-abstracting type radical initiator, such as benzoyl peroxide, to run a chain transfer. Alternatively, the graft copolymer can be obtained by the so-called "photograft polymerization" i.e., a photo-functional group is incorporated in component B and component A or component A' is grafted to component B by using the radical formed by the photolysis of the photofunctional group. The photograft polymerization can control the amount of active sites. The structure and the position of grafting obtained with the photografting technique are more desirable because a polymer having a high grafting ratio and a better molecular design can be obtained.

N,N-dialkyldithiocarbamate groups are preferred as such photo-functional groups, and diethyldithiocarbamate group (herein "DTC group") is particularly preferred because it is easier to incorporate and leads to a higher stability product. For example, a vinyl polymer comprising vinyl chloride units is mixed with sodium diethyldithiocarbamate in N,N-dimethylformamide and then heated at 50° to 60° C. to easily obtain a photofunctional stem polymer containing DTC group. This component B polymer can be easily photo-graft polymerized with component A or A' by dissolving the monomers of components A or A' in a solvent such as tetrahydrofuran, dimethylformamide and cyclohexanone and irradiating in an inert gas atmosphere with ultraviolet radiation by using, for example, a high pressure mercury lamp.

The ratio of component A or component A' to component B in the graft copolymer of the present invention can be arbitrarily varied. However, it is preferred that the amount of component A or component A' is higher than about 5 weight %, where the effect of the graft polymerization starts to appear, more preferably higher than 10 weight %.

The graft copolymer of this invention thus obtained shows thermally reversible behavior like the thermally reversible homopolymer. Further, the graft copolymer of the present invention does not dissolve in water at low temperatures and excels also in moldability and mechanical properties.

The graft copolymer of the present invention is soluble in a volatile organic solvent such as tetrahydrofuran, dimethylformaldehyde and cyclohexanone and accordingly can easily be fixed on the surfaces of various substrates such as sheets, plates, films, and filters by the so-called solvent casting. Thus, various products or articles now exsisting can easily be imparted thermal reversibility with the graft copolymer of the present invention. The thermally reversible vinyl chloride graft polymers is useful as a medical material, as a coating agent for cell cultures, as a material for packaging foods, as a selective permeable membrane, as a separation membrane, as a light-shielding member for greenhouse, etc.

The examples which follow are given for illustrative purposes and are not meant to limit the invention.

EXAMPLE 1

Commercially available polyvinyl chloride 100 g (herein "PVC", degree of polymerization: about 1100, a product of Wako Pure Chemical Industries, Ltd.) was dissolved in dimethylformamide (herein "DMF") 2 liters, and then sodium diethyldithiocarbamate (herein "DTC-Na") about 3 g was added to carry out the reaction at 60° C. for 4 hours with agitation. After completion of the reaction, the polymer solution was added dropwise in a water/methanol (volume ratio: 1/1) mixed medium to precipitate the polymer. In order to remove NaCl formed in the reaction, the precipitated polymer was washed several times with deionized water, and then dried at room temperature in vacuum to obtain DTC-modified polyvinyl chloride (herein "DTC-PVC"). The amount of diethyldithiocarbamate group (herein "DTC group") incorporated into the PVC by the reaction was determined by the elemental analysis of Cl. It was 1.24 mol %.

The DTC-PVC thus prepared 10 g and N-isopropyl acrylamide (herein "NIPAAm") 50 g were dissolved in about one liter of THF, and photo-graft polymerized at 30° C. for 12 hours by using a 100 W high pressure mercury lamp to irradiate from outside. During this process, the NIPAAm was polymerized to form "PNIPAAm" grafted to the PVC ("PVC-graft-PNIAAm"). The graft copolymer solution thus obtained was added dropwise to a water/methanol (volume ratio: 1/1) mixed medium to precipitate the copolymer which was then dried at room temperature in vacuum to obtain the PVC-graft-PNIPAAm.

The PVC-graft-PNIPAAm thus obtained was washed with water at 10° C., and the weight before and after washing with water was measured. As a result, no change in weight was observed. This clearly indicates that the PNIPAAm in this graft copolymer is completely grafted to PVC. The amount of the grafted component in the PVC-graft-PNIPAAm was determined from the result of the elementary analysis of Cl, and it was 45 weight %.

The PVC-graft-PNIPAAm 1.5 mg was added with distilled water 20 μl and the mixture was subjected to differential scanning calorimetry (herein "DSC") at a rate of raising temperature of 2° C. per minute. As a result, an endothermic peak was observed at 32° C. and this corresponds to the LCST of the grafted PNIPAAm.

EXAMPLE 2

The DTC-PVC as prepared in Example 1 10 g and NIPAAm 50 g were added with n-butyl methacrylate (herein "BMA") 3.3 g and the mixture was subjected to graft polymerization in the same manner as in Example 1 to give a polyvinyl chloride graft-polymerized with a random copolymer of NIPAAm and BMA [herein "PVC-graft-P(NIPAAm-co-BMA)]. The amount of the grafted component was 63 weight %. An endothermic peak by DSC was observed at 24° C. and this corresponds to the LCST of the grafted P(NIPAAm-co-BMA).

EXAMPLE 3

The procedure of Example 1 was repeated except that the amount of DTC-Na employed was changed from about 3 g to 30 g. As a result, the amount of DTC in the DTC-PVC was 9.54 mol % and the amount of the grafted PNIPAAm in the PVC-graft-PNIPAAm was 75 weight %. Also, an endothermic peak by DSC was observed at 32° C. and this corresponds to the LCST of the grafted PNIPAAm.

EXAMPLE 4

The PVC-graft-PNIPAAm as prepared in Example 3 was dissolved in THF to prepare a 3 weight % solution. This polymer solution was coated on a glass plate and dried at room temperature in vacuum to prepare a membrane having a thickness of about 30 μm, and then the weight of the membrane was measured. After soaking the membrane in a water tank held at a specified temperature in the range of 10° C. to 50° C., the weight of the wet membrane was measured. Water content represented by the following formula was calculated, and the relation between temperature and water content was graphed (FIG. 1).

$$\text{Water Content} = \frac{\text{Weight of Wet Membrane} - \text{Weight of Dry Membrane}}{\text{Weight of Wet Membrane}}$$

As clearly illustrated in FIG. 1, the water content of PVC-graft-PNIPAAm significantly changes near 30° C. Thus, although the water content is high at a temperature lower than about 30° C., it abruptly declines when the temperature exceeds 30° C. This change in water content is thermally reversible and is due to the hydrophobic/ hydrophilic interconversion which corresponds to the LCST of the grafted PNIPAAm.

EXAMPLE 5

The PVC-graft-PNIPAAm as prepared in Example 3 was dissolved in THF to prepare a 5 weight % solution. Using this polymer solution, a PVC-graft-PNIPAAm coated layer having a thickness of about 5 μm was formed on an about 100 μm-thick polyester film by a solvent casting technique. Change in contact angle of water-air-surface tri-phase system of the coated film with temperature was measured and the results are as shown in FIG. 2.

Figure 2:
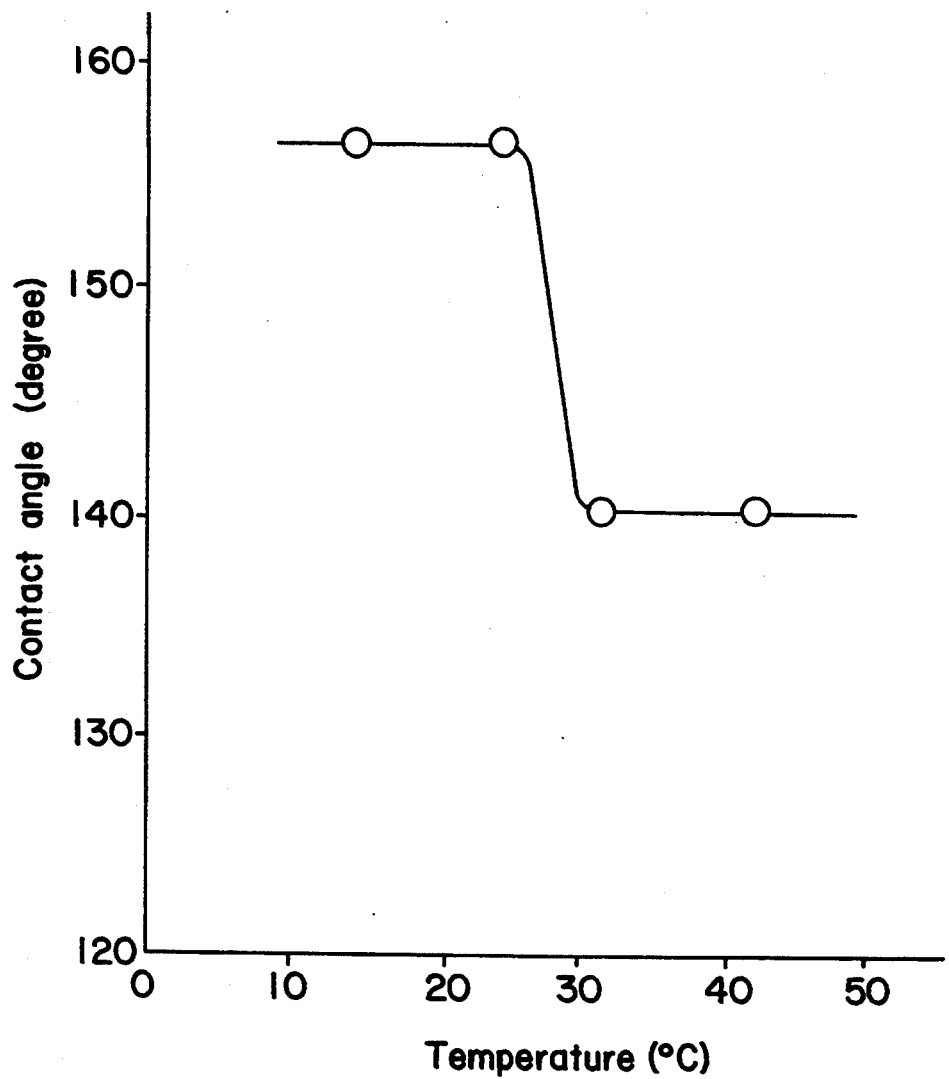
FIG. 2 is a graph showing the relationship between the contact angle of polyvinyl chloride graftpolymerized with poly(N-isopropyl acrylamide) and temperature.

As clearly illustrated in FIG. 2, the contact angle of the coated surface is higher (hydrophilic) if the temperature is lower than about 30° C. and it changes drastically near 30° C. At temperatures higher than 30° C., the contact angle becomes lower (hydrophobic). This change in contact angle is thermally reversible, and it is due to the hydrophilic/hydrophobic conversion which corresponds to the LCST of the grafted PNIPAAm.

We claim:

1. A graft copolymer obtained by grafting a component selected from,
   (i) a monomer of a N-substituted acrylamide or methacrylamide derivative or
   (ii) a mixture of a N-substituted acrylamide or methacrylamide derivative and a monomer copolymerizable with said N-substituted acrylamide or methacrylamide derivative, onto a vinyl polymer comprising vinyl chloride units in its main chain, wherein the amount of said component (i) or (ii) in the graft copolymer is at least 5 weight %, and wherein the grafted component which is a homopolymer of said monomer (i) or a copolymer of said mixture (ii) has an LCST of 0° C. to 100° C. in water.

2. The graft copolymer of claim 1, wherein said N-substituted acrylamide or methacrylamide derivative is selected from the group consisting of N-acryloyl piperidine, N-n-propyl methacrylamide, N-isopropyl acrylamide, N,N-diethyl acrylamide, N-isopropyl methacrylamide, N-cyclopropyl acrylamide, N-acryloyl pyrrolidine, N,N-ethylmethyl acrylamide, N-cyclopropyl methacrylamide and N-ethyl acrylamide.

3. The graft copolymer of claim 2, wherein said N-substituted acrylamide or methacrylamide derivative is N-isopropyl acrylamide.

4. The graft copolymer of claim 1, wherein said monomer copolymerizable with said N-substituted acrylamide or methacrylamide derivative is a hydrophilic monomer selected from the group consisting of N-vinyl pyrrolidone, vinyl pyridine, acrylamide, methacrylamide, N-methyl acrylamide, hydroxyethyl methacrylate, hydroxyethyl acrylate, hydroxymethyl methacrylate, hydroxymethyl acrylate, acrylic acid, methacrylic acid, vinylsulfonic acid, styrenesulfonic acid, N,N-dimethylaminoethyl methacrylate, N,N-diethylaminoethyl methacrylate, N,N-dimethylaminopropyl acrylamide, and salts thereof.

5. The graft copolymer of claim 1, wherein said monomer copolymerizable with said N-substituted acrylamide or methacrylamide is a hydrophobic monomer selected from the group consisting of ethyl acrylate, methyl methacrylate, n-butyl methacrylate, and glycidyl methacrylate.

6. The graft copolymer of claim 5, wherein said hydrophobic monomer is n-butyl methacrylate.

7. The graft of copolymer of claim 1, wherein said vinyl polymer is a vinyl polymer comprising at least 10% by weight of vinyl chloride units in its main chain.

8. The graft copolymer of claim 7, wherein said vinyl polymer is a vinyl chloride homopolymer.

9. The graft copolymer of claim 1, wherein said amount is at least 10 weight %.

10. An article exhibiting thermal reversibility whose surface is coated with the graft copolymer of claim 1.

11. A method for preparing a thermally reversible graft copolymer comprising:
   (a) selecting a component from (i) a monomer of a N-substituted acrylamide or methacrylamide derivative or (ii) a mixture of a N-substituted acrylamide or methacrylamide derivative and a monomer copolymerizable with said N-substituted acrylamide or methacrylamide derivative; and
   (b) grafting said monomer (i) or mixture (ii) onto a vinyl polymer comprising vinyl chloride units in its main chains,
   wherein the amount of said component (i) or (ii) in the graft copolymer is at least 5 weight %, and wherein the grafted component which is a thermally reversible homopolymer of said monomer (i) or a thermally reversible copolymer of said mixture (ii) has an LCST of 0° C. to 100° C. in water.

12. The method of claim 11 wherein said N-substituted acrylamide or methacrylamide derivative is selected from the group consisting of N-acryloyl piperidine, N,n-propyl methacrylamide, N-isopropyl acrylamide, N,N-diethyl acrylamide, N-isopropyl methacrylamide, N-cyclopropyl acrylamide, N-acryloyl pyrrolidine, N,N-ethylmethyl acrylamide, N-cyclopropyl methacrylamide and N-ethyl acrylamide.

13. The method of claim 12 wherein said N-substituted acrylamide or methacrylamide derivative is N-isopropyl acrylamide.

* * * * *